US008702080B2

(12) United States Patent
Halpin

(10) Patent No.: US 8,702,080 B2
(45) Date of Patent: Apr. 22, 2014

(54) METHOD AND SYSTEM FOR DUAL RESOLUTION TRANSLATION STAGE

(75) Inventor: John Michael Halpin, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 828 days.

(21) Appl. No.: 12/782,640

(22) Filed: May 18, 2010

(65) Prior Publication Data

US 2011/0286122 A1 Nov. 24, 2011

(51) Int. Cl.
*B23Q 3/18* (2006.01)
*B25B 1/22* (2006.01)
*B23Q 3/00* (2006.01)

(52) U.S. Cl.
USPC ................................ 269/60; 269/310; 269/71

(58) Field of Classification Search
USPC .......... 269/309–310, 313–314, 55, 60, 58, 71
See application file for complete search history.

(56) References Cited

U.S. PATENT DOCUMENTS

| 3,658,143 | A | * | 4/1972 | Schwartz | 177/208 |
| 3,936,163 | A | * | 2/1976 | Toth | 351/243 |
| 4,848,003 | A | * | 7/1989 | Westphal et al. | 33/384 |
| 4,961,115 | A | * | 10/1990 | Jessop | 348/374 |
| 5,025,568 | A | * | 6/1991 | Grimes | 33/371 |
| 6,189,876 | B1 | * | 2/2001 | Frazier | 269/21 |
| 6,346,710 | B1 | * | 2/2002 | Ue | 250/442.11 |
| 6,760,167 | B2 | * | 7/2004 | Meehan et al. | 359/822 |
| 7,117,724 | B1 | | 10/2006 | Goodberlet et al. | |
| 7,421,918 | B2 | | 9/2008 | Cable et al. | |
| 7,508,602 | B2 | * | 3/2009 | Arnone et al. | 359/811 |
| 7,574,812 | B2 | * | 8/2009 | Dabrowski et al. | 33/333 |
| 7,709,782 | B2 | * | 5/2010 | Green et al. | 250/221 |
| 8,016,277 | B2 | * | 9/2011 | Choi et al. | 269/58 |
| 8,341,823 | B1 | * | 1/2013 | Maciejewski et al. | 29/559 |
| 2002/0150398 | A1 | * | 10/2002 | Choi et al. | 396/428 |
| 2011/0037212 | A1 | * | 2/2011 | Marrinan et al. | 269/296 |
| 2012/0039438 | A1 | * | 2/2012 | Parham et al. | 378/62 |

OTHER PUBLICATIONS

U.S. Appl. No. 12/782,636, filed May 18, 2010; Inventor: John Michael Halpin.

* cited by examiner

*Primary Examiner* — Elizabeth A Plummer
(74) *Attorney, Agent, or Firm* — Kilpatrick Townsend & Stockton

(57) ABSTRACT

A dual resolution translation stage includes a stage assembly operable to receive an optical element and a low resolution adjustment device mechanically coupled to the stage assembly. The dual resolution stage also includes an adjustable pivot block mechanically coupled to the stage assembly. The adjustable pivot block includes a pivot shaft. The dual resolution stage further includes a lever arm mechanically coupled to the adjustable pivot block. The lever arm is operable to pivot about the pivot shaft. The dual resolution stage additionally includes a high resolution adjustment device mechanically coupled to the lever arm and the stage assembly.

12 Claims, 14 Drawing Sheets

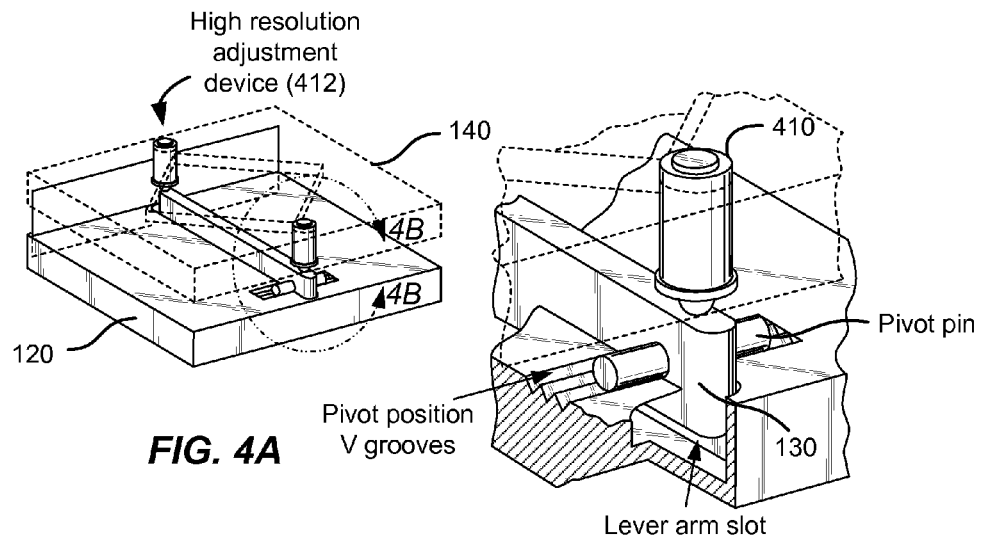
FIG. 4A
FIG. 4B
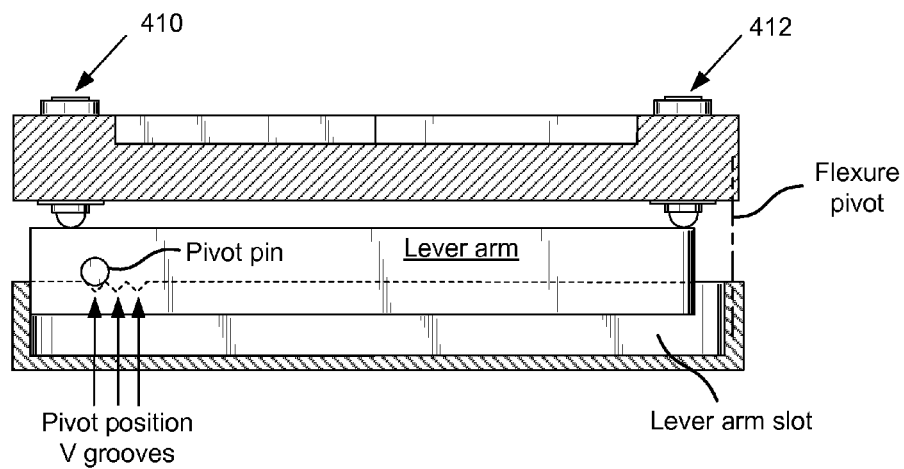
FIG. 4C

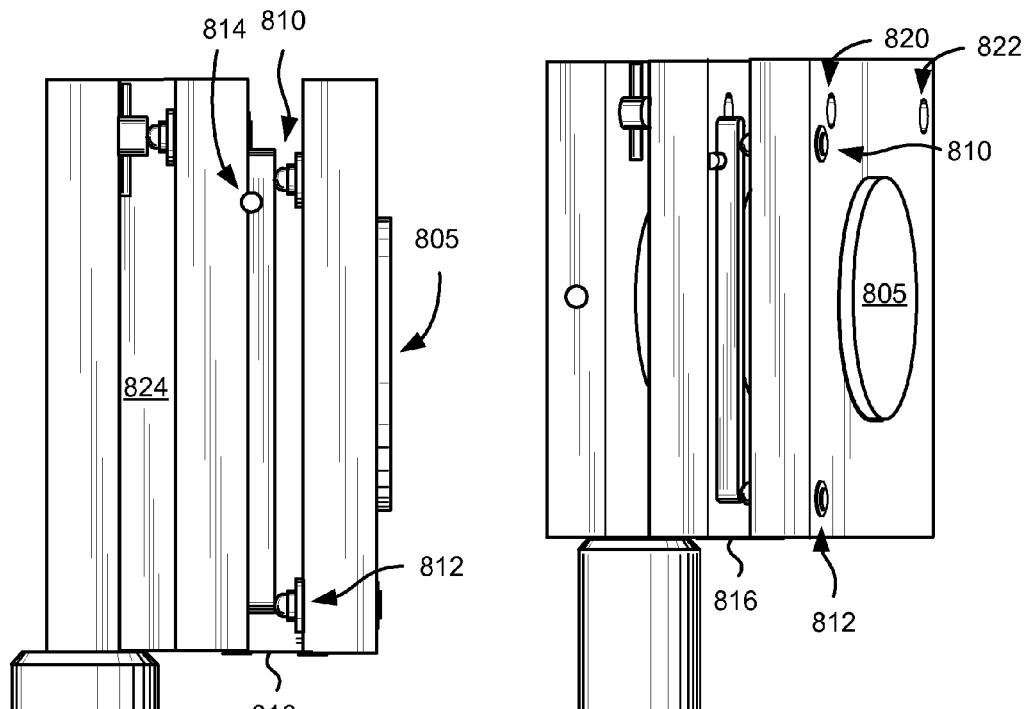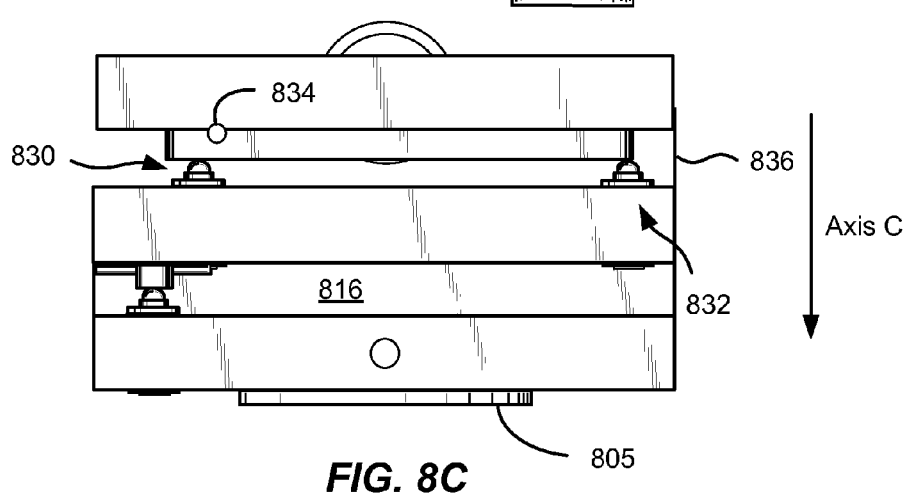

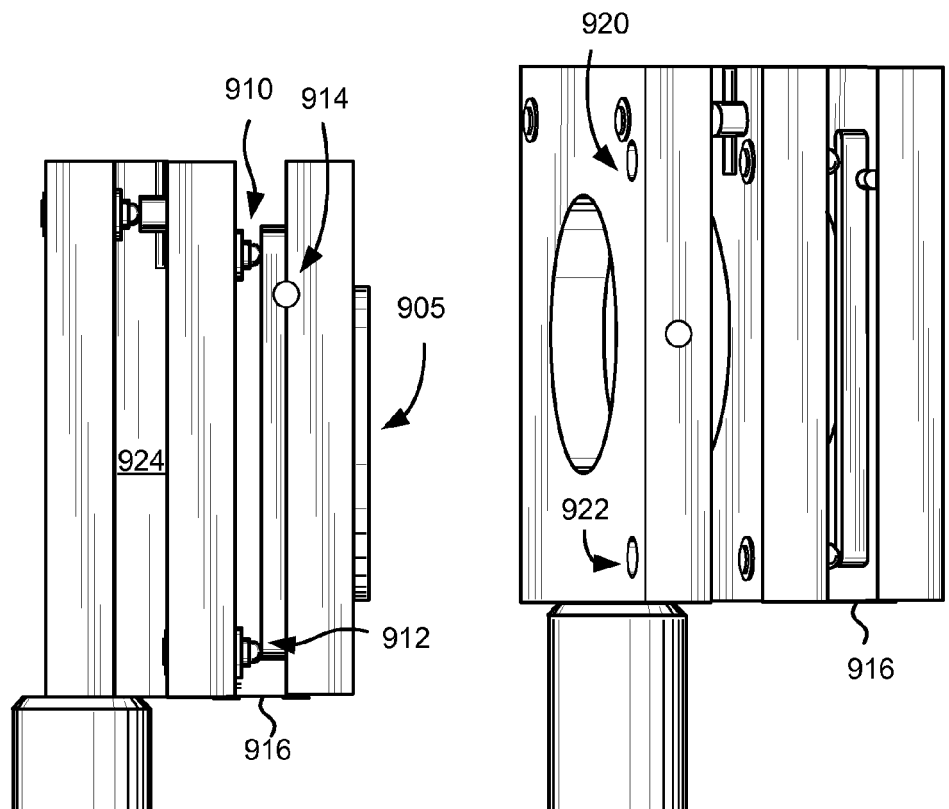
FIG. 9A
→ Axis A
FIG. 9B
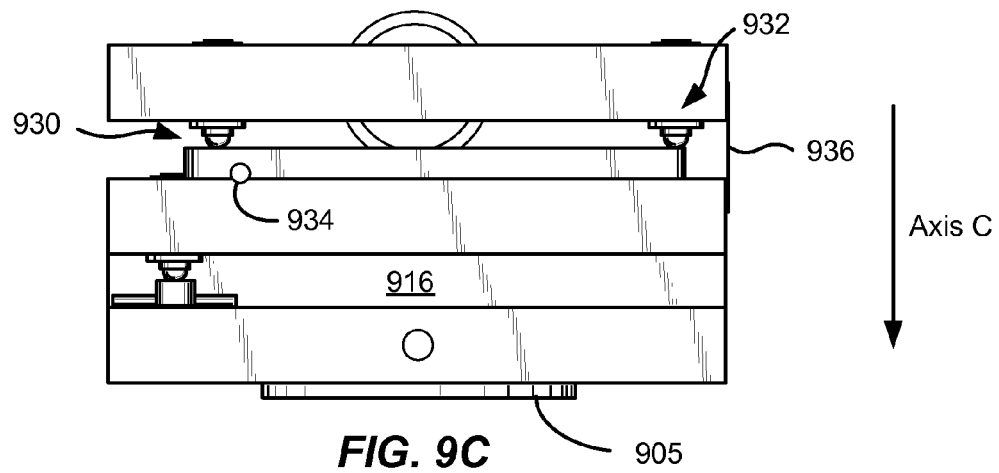
FIG. 9C
↓ Axis C

METHOD AND SYSTEM FOR DUAL RESOLUTION TRANSLATION STAGE

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

CROSS-REFERENCES TO RELATED APPLICATIONS

The following two regular U.S. patent applications (including this one) were filed concurrently, and the entire disclosure of U.S. patent application Ser. No. 12/782,636, is hereby incorporated by reference into this application for all purposes:
application Ser. No. 12/782,636, filed May 18, 2010, entitled "Dual Resolution, Vacuum Compatible Optical Mount"; and
application Ser. No. 12/782,640, filed May 18, 2010, entitled "Method and System for Dual Resolution Translation Stage".

BACKGROUND OF THE INVENTION

High resolution adjustment of optical components (e.g., mirrors, lenses, filters, optical fibers, and other optical elements) in a limited space and a vacuum environment presents a significant challenge. In some optics applications, various components, for example, mirrors and lenses, are mounted on an optical mount, which is then placed on an optical table. Considerable effort is often expended in obtaining a proper optical adjustment of the optical components to facilitate the desired optical alignment. In high resolution applications (e.g., less than 100 μrad), the tolerances on the alignment of the individual optical components becomes smaller, hence requiring more precise alignment devices that occupy smaller volumes.

Motorized actuators utilizing screws and worm gears have been used to adjust optical components. These actuators may be mounted to an optical mount supporting the optical element and are commonly referred to as X-Y-Z translation stages. Another type of translation stage is a differential micrometer, which utilizes two different threads arranged such that the net linear movement achieved is a result of the difference in the pitch of the two different threads. Both motorized actuators and differential micrometers can be bulky and generate unwanted heat and contamination resulting from volumes of gas trapped in the micrometer (i.e., "virtual leaks").

Therefore, there is a need in the art for improved methods and systems for adjustable mounts for optical components.

SUMMARY OF THE INVENTION

According to the present invention, techniques related to optical systems are provided. More particularly, embodiments of the present invention relate to methods and systems for providing dual resolution control of an optical mount. Utilizing an open architecture that is vacuum compatible, a lever arm and multiple adjustment actuators are used to achieve differential motion advantage for the opto-mechanical mount. The methods and systems described herein are also applicable to a variety of optical systems.

According to an embodiment of the present invention a compact, vacuum compatible, dual resolution adjustment device is provided. This device, which is referred to as a dual resolution mount, includes a lever arm, a pivot point, and two actuators (e.g., adjustment screws). In order to tilt or translate one surface with respect to another surface, the lever arm is placed between the two surfaces and the first actuator placed at one end of the lever arm close to the pivot point is used to accomplish coarse adjustment of the surfaces. Fine adjustment of the two surfaces is accomplished using the second actuator placed at the other end of the lever arm, since the position of the second actuator is located at a greater distance from the pivot point than the first actuator. The exact increase in resolution (i.e., fine adjustment/coarse adjustment) is directly related to the ratio of the two distances.

According to another embodiment of the present invention, a vacuum compatible, dual resolution translation stage is provided. This device, which provides for coarse adjustment and fine adjustment of the position of a stage assembly, includes a stage assembly with a low resolution adjustment device mechanically coupled to the stage assembly. The low resolution adjustment device makes contact with a first portion of a lever arm. A high resolution adjustment device makes contact with a second portion of the lever arm. When the high resolution adjustment device is actuated, the lever arm pivots about a pivot point (e.g., the center of a cylindrical shaft oriented perpendicular to the length of the lever arm) to move the first portion of the lever arm. The first portion of the lever arm moves the low resolution adjustment device, which, in turn, translates the stage assembly by a predetermined amount.

According to a specific embodiment of the present invention, an optical mount for an optical element is provided. The optical mount includes a mounting plate having a mounting surface and a pivot surface opposing the mounting surface and a lever arm pivot coupled to the pivot surface. The optical mount also includes an adjustment plate having an adjustment surface and a device surface opposing the adjustment surface. The device surface is operable to receive the optical element. The optical mount further includes a flexure pivot mechanically coupling the adjustment plate to the mounting plate and a lever arm disposed between the pivot surface and the adjustment surface. The lever arm makes contact with the lever arm pivot at a pivot point. The optical mount additionally includes a first adjustment device coupled to the adjustment plate and extending from the adjustment surface to make contact with the lever arm at a first contact point. A projection of a line from the first contact point to the pivot point, measured along the lever arm, is a first predetermined distance. Moreover, the optical mount includes a second adjustment device coupled to the adjustment plate and extending from the adjustment surface to make contact with the lever arm at a second contact point. A projection of a line from the second contact point to the pivot point, measured along the lever arm, is a second predetermined distance greater than the first predetermined distance.

According to another embodiment of the present invention, an optical mount is provided. The optical mount includes a first substrate having a pivot attached to a first surface of the first substrate and a lever arm positioned substantially parallel to the first substrate and making contact with the pivot at a pivot region. The optical mount also includes a second substrate mechanically coupled to the first substrate by a flexure pivot and a low resolution adjustment shaft extending through the second substrate in an adjustment direction and making contact with the lever arm at a first contact point. A projection of a line from the first contact point to a center of the pivot region, measured along the lever arm, defines a low resolution distance and a resolution provided by the low resolution adjustment shaft is equal to a distance the low resolution adjustment shaft moves in the adjustment direction per revolution times a distance from the first contact point to the flexure pivot. The optical mount further includes a high resolution adjustment shaft extending through the second substrate in the adjustment direction and making contact with the lever arm at a second contact point. A projection of a line from the second contact point to a center of the pivot region, measured along the lever arm, defines a high resolution distance and a resolution provided by the high resolution adjustment shaft is equal to the resolution provided by the low resolution adjustment shaft times a ratio of the high resolution distance to the low resolution distance.

According to a specific embodiment of the present invention, a method of operating a dual resolution optical mount for an optical element is provided. The method includes extending a first adjustment shaft by a first predetermined distance from an adjustment surface of an adjustment plate. The adjustment plate includes a device surface opposing the adjustment surface, the device surface is operable to support the optical element, and the first adjustment shaft makes contact with a lever arm at a first contact point. A projection of a line from the first contact point to a pivot point of the lever arm, measured along the lever arm, is a first predetermined distance. The method also includes tilting the adjustment plate by a first angular value in response to extending the first adjustment shaft and extending a second adjustment shaft by a second predetermined distance from the adjustment surface of the adjustment plate. The second adjustment shaft makes contact with the lever arm at a second contact point and a projection of a line from the second contact point to the pivot point of the lever arm, measured along the lever arm, is a second predetermined distance greater than the first predetermined distance. The method further includes tilting the adjustment plate by a second angular value in response to extending the second adjustment shaft.

According to another specific embodiment of the present invention, a dual resolution translation stage is provided. The dual resolution stage includes a stage assembly operable to receive an optical element and a low resolution adjustment device mechanically coupled to the stage assembly. The dual resolution stage also includes an adjustable pivot block mechanically coupled to the stage assembly. The adjustable pivot block includes a pivot shaft. The dual resolution stage further includes a lever arm mechanically coupled to the adjustable pivot block. The lever arm is operable to pivot about the pivot shaft. The dual resolution stage additionally includes a high resolution adjustment device mechanically coupled to the lever arm and the stage assembly.

According to a particular embodiment of the present invention, a method of operating a translation stage having a lever arm mechanically coupled to a stage assembly by a lever arm pivot is provided. The method includes extending a first adjustment shaft by a first predetermined distance. The first adjustment shaft makes contact with the lever arm at a first contact point. The method also includes moving the stage assembly by the first predetermined distance in response to extending the first adjustment shaft by the first predetermined distance and extending a second adjustment shaft by a second predetermined distance. The second adjustment shaft makes contact with the stage assembly at a second contact point. The method further includes moving the translation stage by a third predetermined distance in response to extending the second adjustment shaft by the second predetermined distance. The third predetermined distance is equal to a projection of a line from the second contact point to a pivot point of the lever arm pivot, measured along the lever arm, divided by a projection of a line from the first contact point to the pivot point of the lever arm pivot, measured along the lever arm, times the second predetermined distance.

Numerous benefits are achieved by way of the present invention over conventional techniques. For example, the present techniques provide optical mounts that are suitable for vacuum operation due to their open construction, which reduces or eliminates trapped gas volumes or "virtual leaks" associated with conventional differential micrometers. Moreover, the compact design provided by embodiments of the present invention enables higher density of optics in a given space. Embodiments of the present invention provide both fixed and adjustable resolution options, which have a wide variety of applications throughout the laser and optics industries. Additionally, motor driven or piezoelectric actuators may be used in conjunction with the dual resolution mount or dual resolution translation stage described herein, resulting in additional improvements in resolution and/or accuracy. Furthermore, embodiments of the present invention provide a dual resolution adjustment function that is well suited for laser cavity alignment applications since low resolution is desirable during coarse alignment of the laser cavity and high resolution adjustment is desirable during high resolution peaking and maintenance of the optimum laser output.

Embodiments of the present invention simplify manufacturing of parts, which reduces costs. Further cost reductions can be realized using high lever arm ratios since standard thread pitch screws can be used in place of precision ground high resolution adjustment screws. Simplification of design as described herein also reduces weight, which is essential to most aerospace applications. These and other objects and features of the present invention and the manner of obtaining them will become apparent to those skilled in the art, and the invention itself will be best understood by reference to the following detailed description read in conjunction with the accompanying drawings.

BRIEF DESCRIPTION OF THE DRAWINGS

FIG. 4A is a simplified perspective view of an adjustable resolution mount according to an embodiment of the present invention;

FIG. 4B is a simplified perspective view of a portion of the adjustable resolution mount illustrated in FIG. 4A;

FIG. 4C is a simplified side-view drawing of the adjustable resolution mount illustrated in FIG. 4A;

FIG. 8A is a simplified side-view drawing illustrating a front adjustable, dual resolution mount according to an embodiment of the present invention;

FIG. 8B is a simplified perspective view of the front adjustable, dual resolution mount illustrated in FIG. 8A;

FIG. 8C is a simplified top-view drawing of the front adjustable, dual resolution mount illustrated in FIG. 8A;

FIG. 9A is a simplified side-view drawing illustrating a rear adjustable, dual resolution mount according to an embodiment of the present invention;

FIG. 9B is a simplified perspective view of the rear adjustable, dual resolution mount illustrated in FIG. 9A;

FIG. 9C is a simplified top-view drawing of the rear adjustable, dual resolution mount illustrated in FIG. 9A;

DETAILED DESCRIPTION OF SPECIFIC EMBODIMENTS

Motorized actuators, for example, the Picomotor™ available from NEWPORT® Corporation of Irvine, Calif., is a dual resolution device that uses a motor controller and joystick to access the high resolution adjustment. By mounting the picomotor on a first plate separated from a second plate using a flexure point, actuation of the picomotor can result in tilting of the second plate with respect to the first plate. The DS-4F high-precision adjuster available from Newport Corporation provides sensitivity 50 times better than a standard micrometer, but is bulky and can be a source of unwanted heat and contamination due to trapped volumes of gas. Thus, although the DS-4F provides higher resolution, it is not typically useful in vacuum applications. Stepper motors and servo motors can provide high resolution, but are even larger than the picomotor and the DS-4F and may require special cooling to dissipate heat when utilized in a vacuum system.

Figure 1:
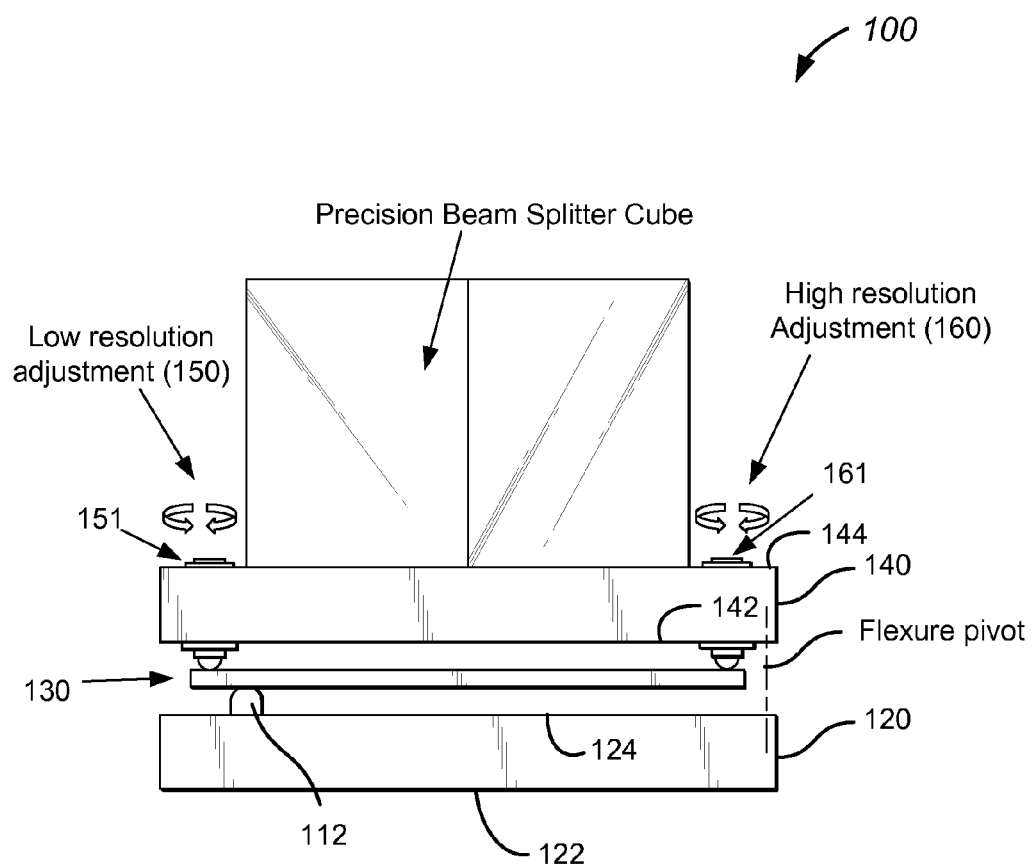
FIG. 1 is a simplified side-view drawing illustrating a dual resolution mount according to an embodiment of the present invention.

FIG. 1 is a simplified side-view drawing illustrating a dual resolution mount according to an embodiment of the present invention. As illustrated in FIG. 1, the dual resolution mount includes a mounting plate 120 (also referred to as a first substrate) having a lever arm pivot point 112. A lever arm 130 makes contact with the lever arm pivot point 112. The lever arm can be made from any suitable material providing mechanical rigidity, for example, aluminum, steel, or the like. The lower surface of the mounting plate 120 can be referred to as a mounting surface 122 and the upper surface of the mounting plate 120 can be referred to as a pivot surface 124. The dual resolution mount also includes an adjustment plate 140 (also referred to as a second substrate) having a low resolution adjustment device 150 and a high resolution adjustment device 160. The lower surface of the adjustment plate 140 can be referred to as an adjustment surface 142 and the upper surface of the adjustment plate 140 can be referred to as a device surface 144.

As illustrated in FIG. 1, a precision beam splitter cube is mounted on the device surface of the adjustment plate. As described more fully throughout the present specification, the surfaces of the mounting plate and the adjustment plate are not necessarily flat, but can include recesses and projections, for example recesses to provide lateral support for the optical elements attached to the device surface 144. Additionally, the pivot surface 124 can include recesses or projections to aid in the mechanical fastening of the lever arm pivot point to the mounting plate. The mounting plate and the adjustment plate can be made from any suitable material providing mechanical rigidity and the ability to be machined into predetermined shapes, for example, aluminum, steel, plastic, composite materials, or the like.

In the particular embodiment illustrated in FIG. 1, the low resolution adjustment device includes a first threaded insert 151 passing through the adjustment plate with a first adjustment screw mounted in the first threaded insert 151 and the high resolution adjustment device includes a second threaded insert 161 passing through the adjustment plate with a second adjustment screw mounted in the second threaded insert 161. As illustrated in FIG. 1, the first adjustment screw is able to extend from the adjustment surface of the adjustment plate and push against the top surface of the lever arm. The first adjustment screw is also able to retract into the first threaded insert. In a similar manner, the second adjustment screw is able to extend from the adjustment surface of the adjustment plate and retract into the second threaded insert.

Although adjustment screws are illustrated in FIG. 1, embodiments of the present invention are not limited to this particular adjustment device and other adjustment shafts can be used for both the low resolution adjustment device and the high resolution adjustment device. As an example, a stepper motor could be used in place of one or more of the adjustment screws, providing an adjustment shaft extending through the adjustment plate in an adjustment direction (i.e., toward the lever arm) and making contact with the lever arm at a contact point. Screws and threaded inserts provide a low profile adjustment device that is substantially coplanar with the device surface of the adjustment plate. Thus, in applications for which a beam passes close to the device surface, screws and threaded inserts are a suitable solution since they present little cross section that would block a beam. Although some embodiments of the present invention utilize fine pitch adjustment screws, the present invention is not limited to this particular implementation. In other applications that allow for significant portions of the adjustment device to extend from both surfaces of the adjustment plate, or applications with differing tolerance metrics, other solutions can be utilized, for example, stepper motors, micrometers, piezoelectric actuators, combinations thereof, or the like.

In order to tilt the optical element (e.g., the precision beam splitter cube) mounted on the dual resolution mount 110 (e.g., a precision beam splitter as illustrated in FIG. 1) in the plane of the figure, the low resolution adjustment device is actuated to displace the left side of the dual resolution mount in the vertical direction. Since the low resolution adjustment device is located close to the lever arm pivot point, a coarse alignment function is provided by actuation of the low resolution adjustment device (e.g., turning of a first adjustment screw). Fine or high resolution adjustment is provided using the high resolution adjustment device (e.g., a second adjustment screw) since the distance from the high resolution adjustment device is located at a greater distance from the level arm pivot point.

The increase in resolution from the low resolution adjustment device to the high resolution adjustment device is related to the ratio of the distance from the high resolution adjustment device to the lever arm pivot point to the distance from the low resolution adjustment device to the lever arm pivot point. For example, if the distance from the low resolution adjustment device to the pivot point, measured along the lever arm, is 1.0 mm and the distance from the high resolution adjustment device to the pivot point, measured along the lever arm, is 10.0 mm, then the lever arm ratio is 10:1. If a first adjustment screw has a given thread pitch that provides 1.0 mrad of tilt per revolution to the adjustment plate, then if a second adjustment screw has the same thread pitch, then one revolution of the second adjustment screw would provide 0.1 mrad of tilt to the adjustment plate. Utilizing embodiments of the present invention, very high resolution is achieved in a mount with a small form factor due to the ability to control the lever ratio. Additionally, some embodiments provide for adjustment of the location of the lever arm pivot point, resulting in greater flexibility for the user to decrease or increase the coarse-to-fine adjustment ratio depending on the particular application.

Referring to FIG. 1, the flexure pivot is attached to the sides of the mounting plate and the adjustment plate and fixes the distance between these two plates at the right-most side of the mount. The flexure pivot also provides a spring loading effect to provide a substantially constant distance between the two plates at the left-most side of the mount. As explained in more detail in the discussion that follows, the distance between the two plates at the left-most side of the mount is not constant, but will vary slightly as the adjustment plate is tilted in the plane of the figure. As the distance between the two plates at the left-most side of the mount increases, tilting the adjustment substrate in the clockwise direction, the flexure pivot undergoes spring compression, providing a restoring force opposing the clockwise tilting. In contrast with a conventional three-point contact kinematic mount, the flexure pivot style mount provides stability for the mount. In some embodiments, the flexure pivot has some curvature, whereas in other embodiments, the sides of the mounting plate and the adjustment plate are tapered or beveled with respect to the plate so that the flexure pivot tends to push the sides of the plates opposite to the flexure pivot together. The flexure pivot can be made from any material that provides a suitable combination of rigidity and flexibility. As examples, the flexure pivot can be made from spring steel fabricated using stainless steel or other suitable steels, or the like.

As described more fully below, adjustment of the low resolution device (e.g., insertion of the first adjustment screw into the threaded insert) moves the left-most side of the adjustment plate up and down as it pivots around the flexure pivot. Therefore, the length of the pivot arm for the low resolution adjustment is the distance between the low resolution adjustment device and the flexure pivot. According to embodiments of the present invention, the distance between the low resolution adjustment device and the flexure pivot ranges from about 10 mm to about 100 mm, with the distance being 45 mm in a particular embodiment.

In a particular embodiment, the low resolution adjustment device includes a 2.5 mm diameter adjustment screw with a 0.2 mm thread pitch mounted in a brass thread insert passing through the adjustment plate. In another embodiment, the high resolution adjustment device also includes a 2.5 mm diameter adjustment screw with a 0.2 mm thread pitch mounted in a brass thread insert passing through the adjustment plate. In other embodiments, the first and second adjustment screws have different diameters, lengths, and thread pitches. As an example, the second adjustment screw could have a smaller thread pitch (e.g., 0.1 mm) in order to increase the resolution of the mount.

The resolution of the low resolution adjustment in this particular embodiment is given by the distance the adjustment screw travels in a revolution divided by the distance between the low resolution adjustment device and the flexure pivot, i.e., 1000 (mrad/rad)*0.2 mm/revolution/45 mm=4.4 mrad/revolution. The resolution of the high resolution adjustment is a function of the lever arm ratio, which is equal to the distance from the high resolution adjustment device to the lever arm pivot point, measured along the lever arm divided by the distance from the low resolution adjustment device to the lever arm pivot point, measured along the lever arm. The distance measured along the lever arm is the projection of these distances on the axis parallel to the lever arm. In an exemplary embodiment, the length of the lever arm between the high resolution adjustment device and the lever arm pivot point is 39 mm and the length of the lever arm between the low resolution adjustment device and the lever arm pivot point is 3 mm. Thus, the resolution of the high resolution adjustment in this embodiment is equal to the resolution of the low resolution adjustment divided by the ratio of the lengths=4.4. mrad/revolution/(39 mm/3 mm)=0.34 mrad/revolution. Thus, the lever arm provides an enhancement in the resolution of the mount.

Figure 2:
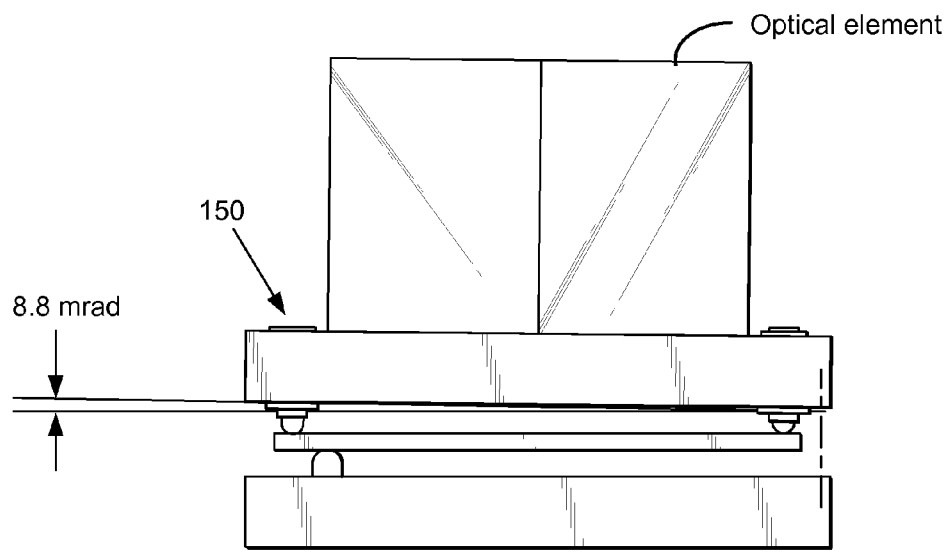
FIG. 2 is a simplified side-view drawing illustrating coarse alignment of the dual resolution mount illustrated in FIG. 1.

FIG. 2 is a simplified side-view drawing illustrating coarse alignment of the dual resolution mount illustrated in FIG. 1. Referring to FIG. 2, extension of the low resolution adjustment shaft, which is a first adjustment screw in the embodiment illustrated in FIG. 2, will apply pressure to the left side of the lever arm. However, since the flexure pivot constrains the motion of the right side of the plates, the rights side of the lever arm is not free to move. Thus, the lever arm remains at a fixed position and the left side of the adjustment plate tilts in a clockwise direction. To lower the left side of the adjustment plate (counter-clockwise tilt), the low resolution adjustment shaft is raised, reducing the extent to which the shaft extends from the adjustment surface. In the illustrated embodiment, a first adjustment screw with a 0.2 mm thread pitch is turned through two revolutions, resulting in extension of the screw from the adjustment surface by an additional 0.4 mm. Since the distance from the first adjustment screw to the flexure pivot is 45 mm, the angular adjustment will be 0.4 mm/45 mm=8.8 mrad.

Figure 3:
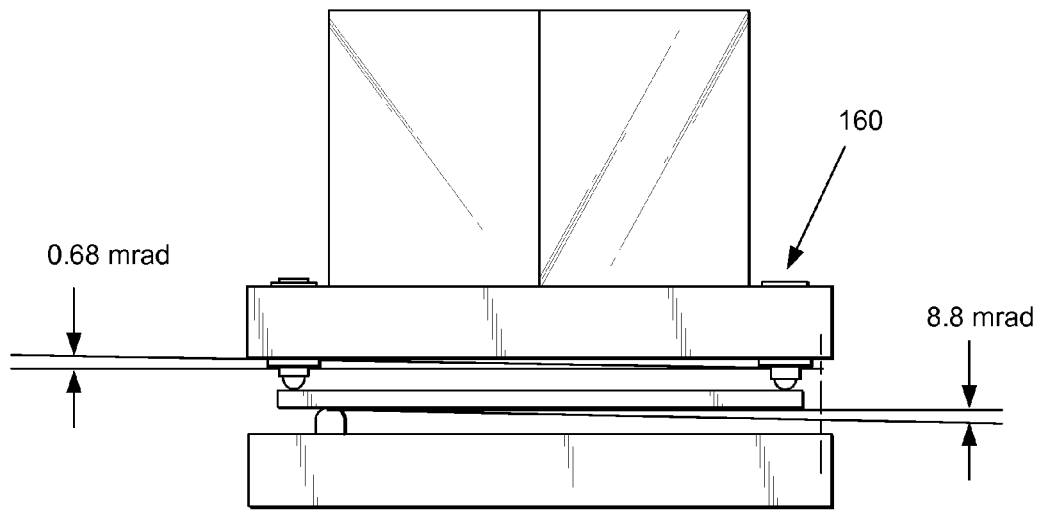
FIG. 3 is a simplified side-view drawing illustrating fine alignment of the dual resolution mount illustrated in FIG. 1.

FIG. 3 is a simplified side-view drawing illustrating fine alignment of the dual resolution mount illustrated in FIG. 1. Because of the flexure pivot attaching the right sides of the mounting plate and the adjustment plate, the distance between the right sides of the plates is fixed. Thus, when the high resolution adjustment device is extended from the adjustment surface of the adjustment plate, the adjustment plate is not able to move up, forcing the right side of the lever arm to move down. In the exemplary embodiment illustrated in FIG. 1, the second adjustment screw is inserted, making two revolutions. For a screw with a 0.2 mm thread pitch, two revolutions result in extension of the screw from the adjustment surface by an additional 0.4 mm. In turn, the right side of the lever arm is pushed down by 0.4 mm. For a lever arm ratio of 39 mm:3 mm, the left side of the lever arm will be raised by 0.03 mm. For a distance of 45 mm from the first adjustment screw to the flexure pivot, the angular adjustment will be 0.68 mrad. Thus, the high:low resolution ratio provided by this dual resolution mount is over a factor of ten.

FIG. 4A is a simplified perspective view of an adjustable resolution mount according to an embodiment of the present invention. The adjustable resolution mount illustrated in FIG. 4A provides for three different high:low resolution ratios depending on the position of a pivot pin.

FIG. 4B is a simplified perspective view of a portion of the adjustable resolution mount illustrated in FIG. 4A. The magnified view provided in FIG. 4B illustrates the low resolution adjustment device 410, with the adjustment shaft extending through the adjustment plate 140 to extend from the adjustment surface. The adjustment shaft makes contact with an upper surface of a lever arm that is free to move within a lever arm slot formed in the mounting plate 120. A pivot pin passes through the lever arm and rests in one of three V grooves formed in the pivot surface of the mounting plate.

FIG. 4C is a simplified side-view drawing of the adjustable resolution mount illustrated in FIG. 4A. Referring to FIG. 4C, the V grooves run perpendicular to the length of the lever arm and enable the lever arm to tilt in the plane of the figure as the lever arm moves freely in the lever arm slot. In order to change the high:low resolution ratio of the mount, the pivot pin passing through the lever arm is moved from one of the three V grooves into another of the V grooves, thereby changing the lever arm ratio. Thus, embodiments of the present invention provide an adjustable resolution, dual resolution mount. The position of the pin in the V groove, together with the lever arm slot, combine to restrain lever arm movement, improve mechanical stability, and decrease the profile of the dual resolution mount.

Although three V grooves are utilized in the embodiment illustrated in FIGS. 4A-4C, other numbers of V grooves are utilized in other embodiments, for example, two V grooves, four V grooves, five V grooves, and the like. A single V groove could be utilized in an implementation of a fixed high:low resolution mount. Additionally, although the spacing between the V grooves is uniform in the embodiment illustrated in FIGS. 4A-4C, other spacings, including non-uniform spacings can be utilized. As an example, the spacing could decrease as the V grooves approach the left side of the lever arm, compensating for the increase in resolution as the distance from the low resolution adjustment device to the pivot point decreases.

Utilizing the 3-position adjustable dual resolution mount illustrated in FIGS. 4A-4C, different resolutions are possible depending on the position of the pivot pin. Table 1 illustrates three different resolutions provided by an embodiment of the present invention.

TABLE 1

| Pivot Position | Low Resolution (mrad/revolution) | Lever Arm Ratio | High Resolution (mrad/revolution) |
|---|---|---|---|
| 1 | 4.4 | 23:1 | 0.19 |
| 2 | 4.4 | 12.5:1 | 0.35 |
| 3 | 4.4 | 8.3:1 | 0.53 |

By varying the position of the V grooves in different designs, the lever arm ratio can be changed in each design, providing variable values for the high resolution. Therefore, although Table 1 illustrates one set of positions for the V grooves, the present invention is not limited to these particular positions and other lever arm ratios are available using embodiments of the present invention. One of ordinary skill in the art would recognize many variations, modifications, and alternatives.

Although lever arm ratios between 8.3:1 and 23:1 are illustrated in Table 1, embodiments of the present invention are not limited to this range and other lever arm ratios can be utilized, for example, in a range greater than 1:1 up to 100:1.

Figure 5A:
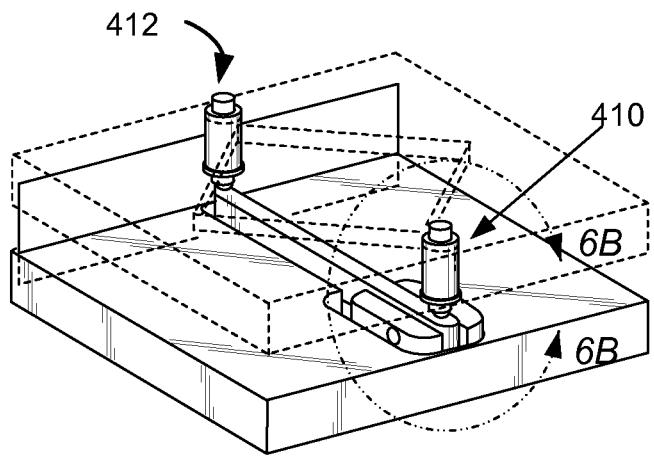
FIG. 5A is a simplified perspective view of an adjustable resolution mount according to another embodiment of the present invention.

FIG. 5A is a simplified perspective view of an adjustable resolution mount according to another embodiment of the present invention. In the embodiment illustrated in FIG. 5A, the pivot pin is mounted in a pivot translation block that is moveable in the direction aligned with the length of the pivot arm. For purposes of comparison with the adjustable resolution mount illustrated in FIG. 4A, the low resolution adjustment device 410 and the high resolution adjustment device 412 are illustrated in FIG. 5A.

Figure 5B:
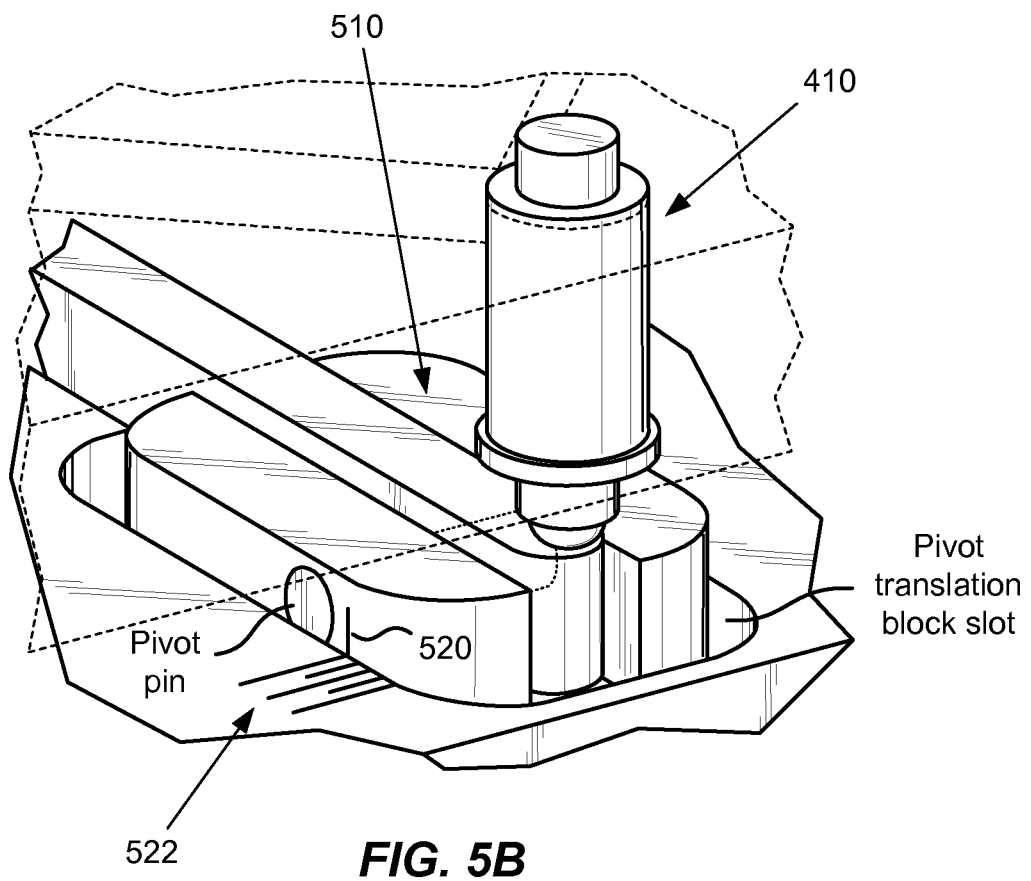
FIG. 5B is a simplified perspective view of a portion of the adjustable resolution mount illustrated in FIG. 5A.
Figure 5C:
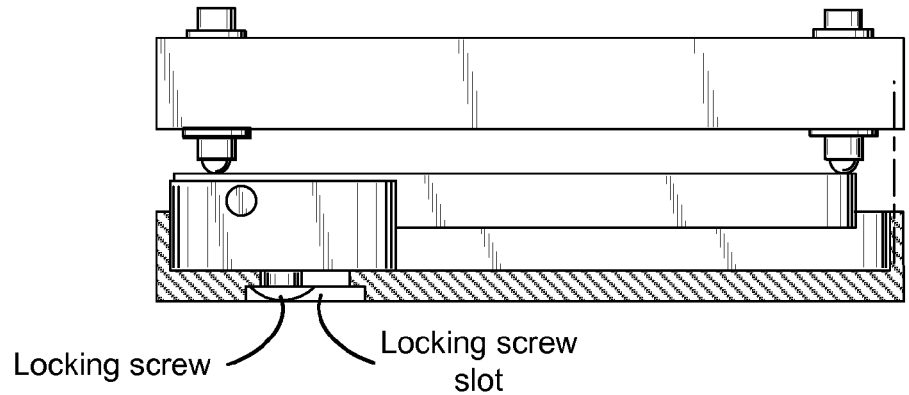
FIG. 5C is a simplified side-view drawing illustrating the adjustable resolution mount illustrated in FIG. 5A at a high resolution position.

FIG. 5B is a simplified perspective view of a portion of the adjustable resolution mount illustrated in FIG. 5A. As illustrated in FIG. 5B, a pivot translation block slot is formed in the pivot surface of the mounting plate. A pivot translation block is able to slide along the direction aligned with the length of the pivot arm. As a result, the distance from the pivot pin to the low resolution adjustment device is variable. As such, the lever arm ratio is varied as the pivot pin moves closer to or farther away from the low resolution adjustment device. In comparison with the embodiment illustrated in FIGS. 4A-C, rather than adjustments in increments defined by the distance between the V grooves, the embodiment illustrated in FIGS. 5A-5C is adjustable along a continuum. Although not shown in FIG. 5B, a mechanism, such as an adjustment micrometer is attached to the pivot translation block 510 in order to move the pivot translation block by the desired amount.

An indicator 520 such as a hash mark is provided on the side of the pivot translation block to enable a system operator to measure the position of the pivot translation block in comparison to a scale 522 formed on the mounting plate. Utilizing the micrometer actuator discussed above, an operator can position the pivot translation block with a high level of accuracy, thereby defining an accurate and controllable distance between the pivot pin and the low resolution adjustment device and the pivot pin and the high resolution adjustment device, which, in turn, defines the lever arm ratio. Accordingly, variable values for the high resolution can be selected as appropriate to the particular application. Although a simple scale is illustrated in FIG. 5B, a vernier scale can be utilized to increase the precision with which the pivot translation block can be positioned. Additionally, other methods of measuring the position of the pivot translation block can be utilized according to embodiments of the present invention, including interferometric methods. As another example, if the mechanism used to move the pivot translation block is motorized, the mechanism may have built-in position information, which can be used to determine the lever arm ratio. One of ordinary skill in the art would recognize many variations, modifications, and alternatives.

FIG. 5C is a simplified side-view drawing illustrating the adjustable resolution mount illustrated in FIG. 5A at a high resolution position. As illustrated in FIG. 5C, the pivot translation block has been moved to the far left position in the pivot translation block slot. In this position, the distance between the low resolution adjustment device and the pivot pin is a minimum value, increasing the lever arm ratio to the maximum value associated with this design. A locking screw is provided in a locking screw slot to fix the position of the pivot translation block in the illustrated position. Other mechanisms for maintaining the position of the pivot translation block can also be utilized. For example, in an embodiment that utilizes a motorized actuator to adjust the position of the pivot translation block the motor could be locked in the final position, performing the same function as the locking screw.

Figure 5D:
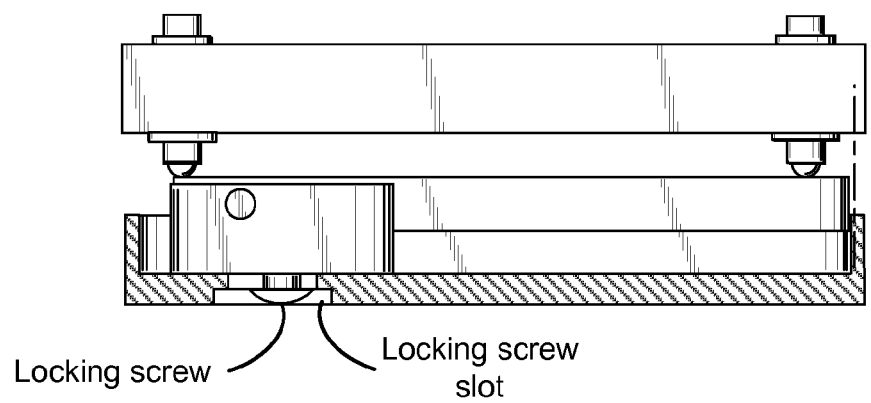
FIG. 5D is a simplified side-view drawing illustrating the adjustable resolution mount illustrated in FIG. 5A at a low resolution position.

FIG. 5D is a simplified side-view drawing illustrating the adjustable resolution mount illustrated in FIG. 5A at a low resolution position. The pivot translation block is positioned farther to the right in comparison with the position illustrated in FIG. 5C (i.e., as the end of travel for the pivot translation block). Thus, the lever arm ratio is decreased, providing a lower value for the high:low resolution ratio. A locking screw can be provided in a locking screw slot and used to fix the position of the pivot translation block once a desired high:low resolution ratio is achieved.

The embodiments of the dual resolution mount described herein have provided for rotation in a first plane (e.g., the plane of FIG. 1). In order to provide for a second degree of freedom, a second dual resolution mount can be positioned with the tilt plane extending into the plane of FIG. 1. The second dual resolution mount will then enable tilting of the optical element in this second plane normal to the first plane. A third dual resolution mounted in a third plane orthogonal to both the first plane and the second plane can be used to provide a third degree of freedom. One of ordinary skill in the art would recognize many variations, modifications, and alternatives.

Figure 6:
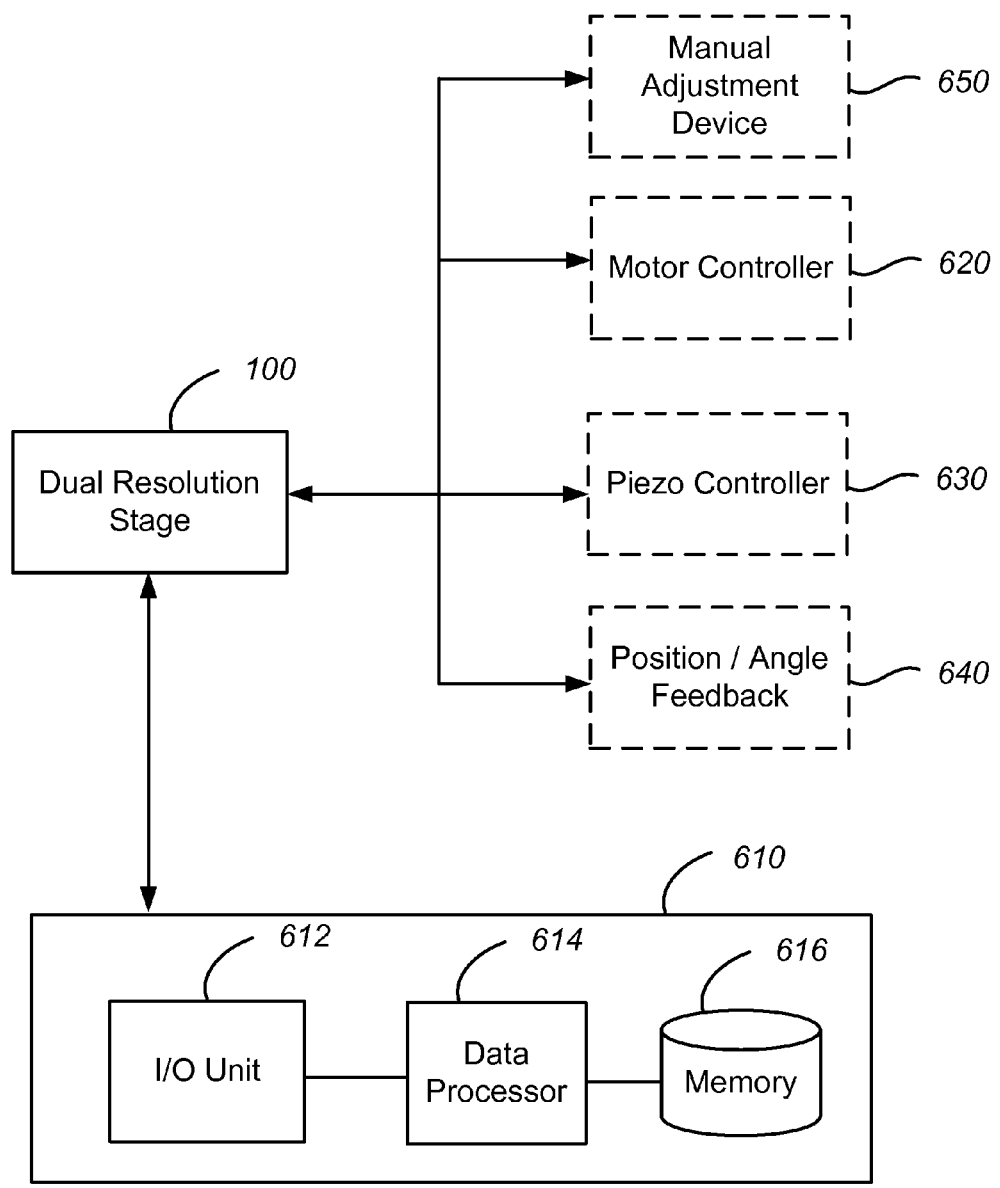
FIG. 6 is a simplified schematic diagram of an optical system according to an embodiment of the present invention.

FIG. 6 is a simplified schematic diagram of an optical system according to an embodiment of the present invention. The optical system includes a dual resolution stage 100 or a dual resolution translation stage 1000 as described more fully throughout the present specification. Although a single dual resolution stage is illustrated in FIG. 6, multiple stages providing for multiple degrees of freedom can be utilized according to embodiments of the present invention. The dual resolution stage 100 is coupled to a computer 610 that includes an Input/Output unit 612, a data processor 614, and a memory 616.

The data processor 614 can be a general purpose microprocessor configured to execute instructions and data, such as a PENTIUM® processor manufactured by the INTEL® Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The memory 616 can be local or distributed as appropriate to the particular application. Memory 616 may include a number of memories including a main random access memory (RAM) for storage of instructions and data during program execution and a read only memory (ROM) in which fixed instructions are stored. Thus, memory 616 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The optical system also includes an optional motor controller 620 that can be used to control one or more of the low resolution adjustment device, the high resolution adjustment device, the pivot translation block, or the like. Although a single motor controller is illustrated, multiple motor controllers can be utilized as appropriate to the particular application. In an embodiment, the motor controller 620 is operated under the control of the computer 610. The optical system also includes an optional piezoelectric controller 630. The piezoelectric controller 630, also referred to as a piezo controller, can be used to provide for high resolution adjustment of one or more elements of the dual resolution stage 100. As an example, the piezo controller 630 could be used to control the high resolution adjustment device, inserting the control shaft by a predetermined distance through the adjustment plate in order to make fine adjustments to the angle of the adjustment plate. The low resolution adjustment device in this exemplary embodiment would be controlled using the motor controller, which does not provide the fine control of the piezo controller, but provides a longer range of travel. One of ordinary skill in the art would recognize many variations, modifications, and alternatives.

Position/angle feedback 640 can be utilized to measure and control the position and/or angle of the adjustment plate of the dual resolution stage. In some embodiments, the feedback is visual, for example, the scale 522 illustrated in FIG. 5B. In other embodiments, the feedback is electronic, for example, provided by a signal from the piezo controller 630 or from an interferometer measuring the positions of the sides of the adjustment plate. The feedback can be used in a control loop to enable a system operator to control the position and/or angle of the adjustment plate through computer 810. Additionally, one or more optional manual adjustment devices 650 can be utilized, for example, the adjustment screws discussed in relation to FIG. 1.

Figure 7:
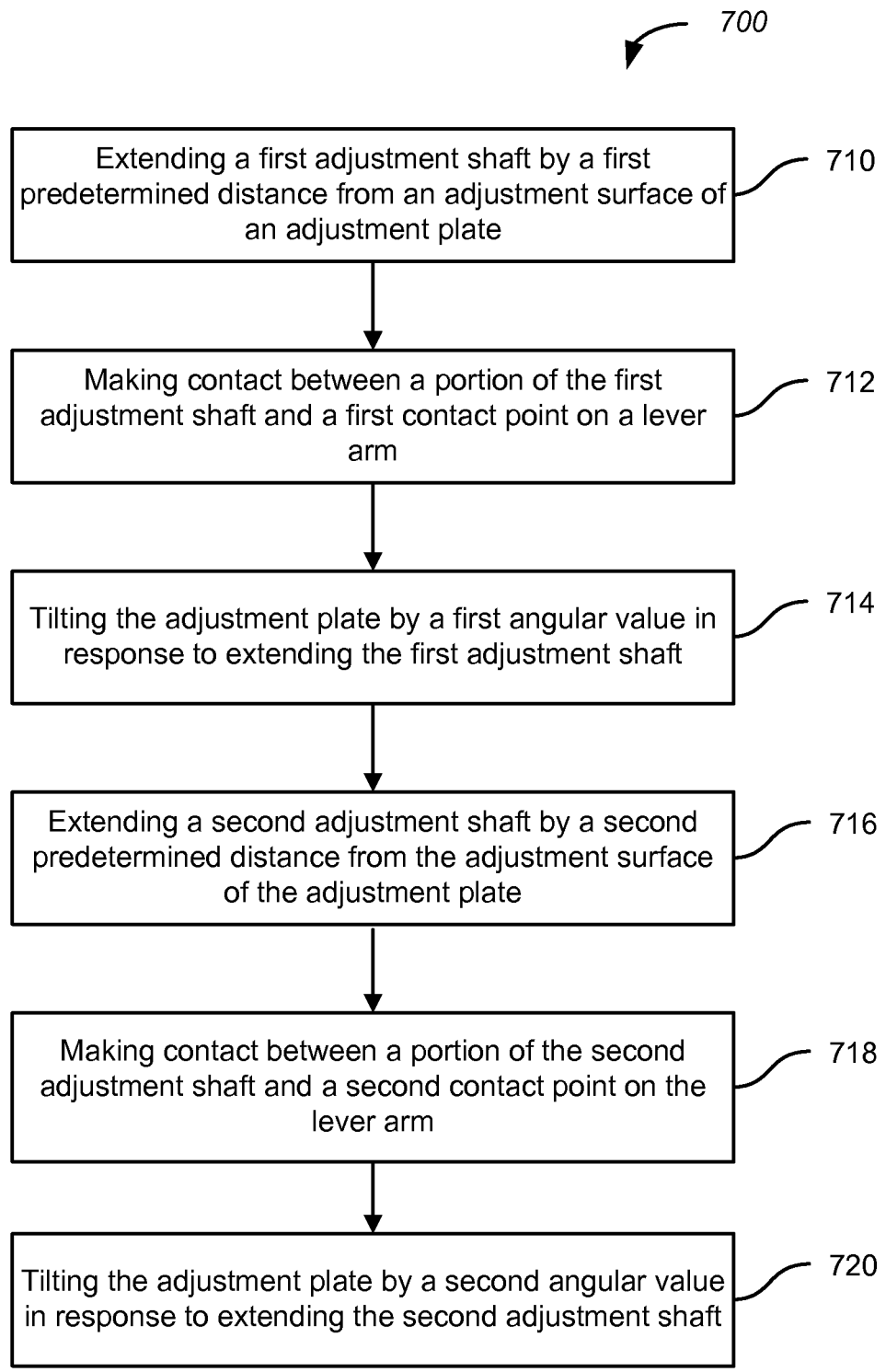
FIG. 7 is a simplified flowchart illustrating a method of operating a dual resolution mount according to an embodiment of the present invention.

FIG. 7 is a simplified flowchart illustrating a method of operating a dual resolution mount according to an embodiment of the present invention. The method 700 includes extending a first adjustment shaft by a first predetermined distance from an adjustment surface of an adjustment plate (710). The adjustment plate includes a device surface opposing the adjustment surface and the device surface is operable to support the optical element. The first adjustment shaft makes contact with a lever arm at a first contact point (712). A projection of a line from the first contact point to a pivot point of the lever arm, measured along the lever arm, is a first predetermined distance. In response to extending the first adjustment shaft, the adjustment plate tilts by a first angular value (714). The first adjustment shaft can be an adjustment screw passing through the adjustment plate, a motorized actuator, a micrometer, a shaft attached to a piezoelectric actuator, or the like.

The method also includes extending a second adjustment shaft by a second predetermined distance from the adjustment surface of the adjustment plate (716). The second adjustment shaft makes contact with the lever arm at a second contact point (718). A projection of a line from the second contact point to the pivot point of the lever arm, measured along the lever arm, is a second predetermined distance greater than the first predetermined distance. Thus, there is a lever arm ratio related to the first distance and the second distance. In response to extending the second adjustment shaft, the adjustment plate tilts by a second angular value (720). Because of the lever arm ratio, the second angular value is less than the second angular value for an equal extension of the first adjustment shaft and the second adjustment shaft.

In embodiments of the present invention, tilting the adjustment plate is performed with respect to a flexure pivot that mechanically couples the adjustment plate to a mounting plate. The mounting plate can be attached to an optical table or other suitable support structure. The position of the lever arm can be shifted along the length of the lever arm to increase or decrease a ratio between the second predetermined distance and the first predetermined distance, thereby changing the lever arm ratio and the two resolutions provided by the dual resolution mount. The position of the lever arm can also be measured using a scale provided on the dual resolution optical mount, for example, on a pivot translation block to which the lever arm is attached.

FIG. 8A is a simplified side-view drawing illustrating a front adjustable, dual resolution mount according to an embodiment of the present invention. The dual resolution mount illustrated in FIG. 8A provides for adjustment for two degrees of freedom, a vertical tilt with respect to an axis A lying in the plane of FIG. 8A and a horizontal tilt with respect to an axis C lying in the plane of FIG. 8C. In order to tilt the mirror 805 with respect to axis A, a low resolution vertical adjustment device 810 and a high resolution vertical adjustment device 812 are provided to apply pressure to a lever arm rotating about pivot 814. The low resolution vertical adjustment device 810 and the high resolution vertical adjustment device 812 are accessible from the front of the dual resolution mount as illustrated in FIG. 8B. As discussed in relation to other devices described herein, the resolution of the high resolution vertical adjustment device 812 will be a function of the distance from the low resolution vertical adjustment device 810 and the flexure 816 as well as the distances, measured along the lever arm, between the adjustment devices and the pivot. Thus, the mirror 805 can be tilted to deflect a beam vertically using the dual resolution mount.

FIG. 8B is a simplified perspective view of the front adjustable, dual resolution mount illustrated in FIG. 8A. FIG. 8C is a simplified top-view drawing of the front adjustable, dual resolution mount illustrated in FIG. 8A. In order to tilt the mirror 805 with respect to axis C, a low resolution horizontal adjustment device 830 and a high resolution horizontal adjustment device 832 are provided to apply pressure to a lever arm rotating about pivot 834. The low resolution horizontal adjustment device 830 and the high resolution horizontal adjustment device 932 are accessible from the front of the dual resolution mount through access holes 820 and 822, respectively, as illustrated in FIG. 8B. As discussed in relation to other devices described herein, the resolution of the high resolution horizontal adjustment device 832 will be a function of the distance from the low resolution horizontal adjustment device 830 and the flexure 836 as well as the distances, measured along the lever arm, between the adjustment devices and the pivot. Thus, the mirror 805 can be tilted to deflect a beam horizontally using the dual resolution mount.

FIG. 9A is a simplified side-view drawing illustrating a rear adjustable, dual resolution mount according to an embodiment of the present invention. In a manner similar to the dual resolution mount illustrated in FIGS. 8A-8C, the dual resolution mount illustrated in FIG. 9A provides for adjustment for two degrees of freedom, a vertical tilt with respect to an axis A lying in the plane of FIG. 9A and a horizontal tilt with respect to an axis C lying in the plane of FIG. 9C. Rather than being adjustable from the front side of the mount, the dual resolution mount illustrated in FIG. 9A is adjustable from the rear.

In order to tilt the mirror 905 with respect to axis A, a low resolution vertical adjustment device 910 and a high resolution vertical adjustment device 912 are provided to apply pressure to a lever arm rotating about pivot 914. The low resolution vertical adjustment device 910 and the high resolution vertical adjustment device 912 are accessible from the rear of the dual resolution mount through access holes 920 and 922, respectively, as illustrated in FIG. 9B. As discussed in relation to other devices described herein, the resolution of the high resolution vertical adjustment device 912 will be a function of the distance from the low resolution vertical adjustment device 910 and the flexure 916 as well as the distances, measured along the lever arm, between the adjustment devices and the pivot. Thus, the mirror 905 can be tilted to deflect a beam vertically using the dual resolution mount illustrated in FIG. 9A.

FIG. 9B is a simplified perspective view of the rear adjustable, dual resolution mount illustrated in FIG. 9A. FIG. 9C is a simplified top-view drawing of the rear adjustable, dual resolution mount illustrated in FIG. 9A. In order to tilt the mirror 905 with respect to axis C, a low resolution horizontal adjustment device 930 and a high resolution horizontal adjustment device 932 are provided to apply pressure to a lever arm rotating about pivot 934. The low resolution horizontal adjustment device 930 and the high resolution horizontal adjustment device 932 are accessible from the rear of the dual resolution mount as illustrated in FIG. 9C. As discussed in relation to other devices described herein, the resolution of the high resolution horizontal adjustment device 932 will be a function of the distance from the low resolution horizontal adjustment device 930 and the flexure 936 as well as the distances, measured along the lever arm, between the adjustment devices and the pivot. Thus, the mirror 905 can be tilted to deflect a beam horizontally using the dual resolution mount.

It should be noted that the front adjustable, dual resolution mount illustrated FIGS. 8A-8C and the rear adjustable, dual resolution mount illustrated in FIGS. 9A-9C share common features. As illustrated in the figures, rotating either of the mounts by 90° about axis A and then rotating by 180° about an axis normal to the plane of the figures, moves the adjustment holes from the front to the rear. As illustrated, both front and rear plates have mounting holes on adjacent sides and are bored to accept the mirror 805/905.

Figure 10A:
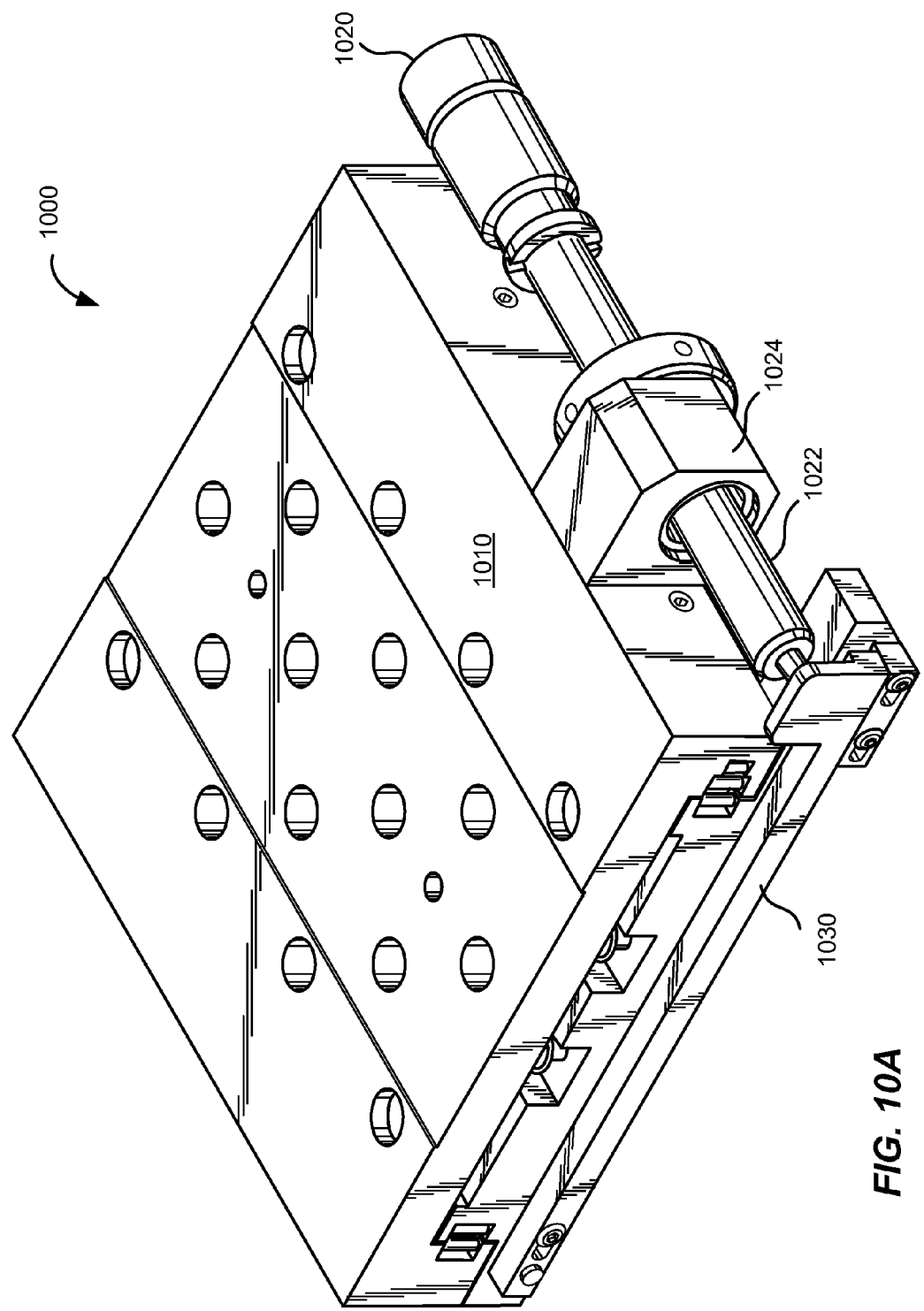
FIG. 10A is a simplified perspective view of a dual resolution translation stage according to an embodiment of the present invention.

FIG. 10A is a simplified perspective view of a dual resolution translation stage according to an embodiment of the present invention. The dual resolution translation stage 1000 includes a stage assembly 1010 operable to receive an optical element. As illustrated in FIG. 10A, a plurality of tapped holes are provided in an upper surface of the stage assembly 1010 to provide for mounting of optical elements, for example, posts supporting lenses, brackets for mirrors, other translation stages, or the like. The dual resolution translation stage also 1000 includes a low resolution adjustment device 1020 mechanically coupled to the stage assembly 1010. In the illustrated embodiment, the low resolution adjustment device is a micrometer mounted to a fixture 1024 provided on the side of the stage assembly. The micrometer includes a shaft 1022 that extends beyond the end of the stage assembly to make contact with a lever arm 1030, which is described in additional detail below. Turning the low resolution adjustment device 1020 (e.g., the micrometer) results in extension of the shaft 1022 and application of pressure to the lever arm 1030. If the position of the lever arm is fixed, then extension of the shaft 1022 will result in movement of the stage assembly 1010 in a direction aligned with the low resolution adjustment device and away from the lever arm. Although a micrometer is illustrated as the low resolution adjustment device in FIG. 10A, the present invention is not limited to this implementation and an adjustment screw, a piezoelectric actuator, a stepper motor, or the like can be utilized as the low resolution adjustment device as appropriate to the particular application.

Figure 10B:
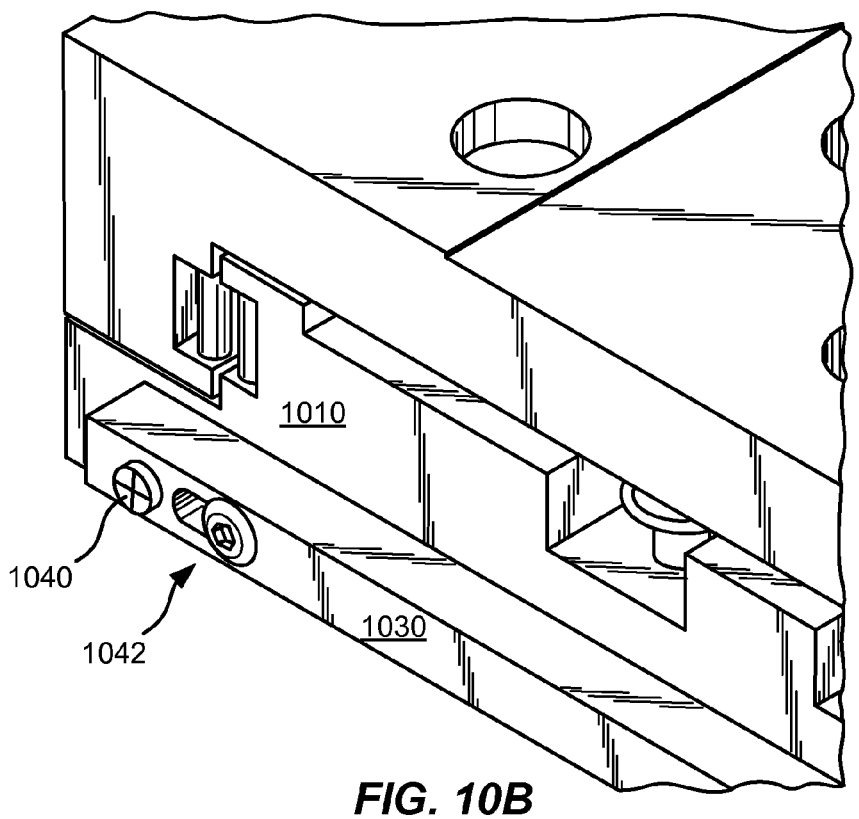
FIG. 10B is a simplified perspective view of the high resolution adjustment device of the dual resolution translation stage illustrated in FIG. 10A.

FIG. 10B is a simplified perspective view of the high resolution adjustment device of the dual resolution translation stage illustrated in FIG. 10A. At one end of the lever arm 1030, a high resolution adjustment device 1040 is provided. The high resolution adjustment device 1040, which may be a screw passing through the lever arm and extending toward the stage assembly 1010, provides for a mechanism to control the distance between the side of the lever arm facing the stage assembly and the stage assembly itself. Additionally, a locking mechanism 1042, for example a locking screw, is provided adjacent the high resolution adjustment device 1040 so that the position of the left end of the lever arm can be fixed in relation to the stage assembly once proper adjustment is achieved. Although an adjustment screw is illustrated as the high resolution adjustment device in FIG. 10B, the present invention is not limited to this implementation and a micrometer, a piezoelectric actuator, a stepper motor, or the like can be utilized as the high resolution adjustment device.

Figure 10C:
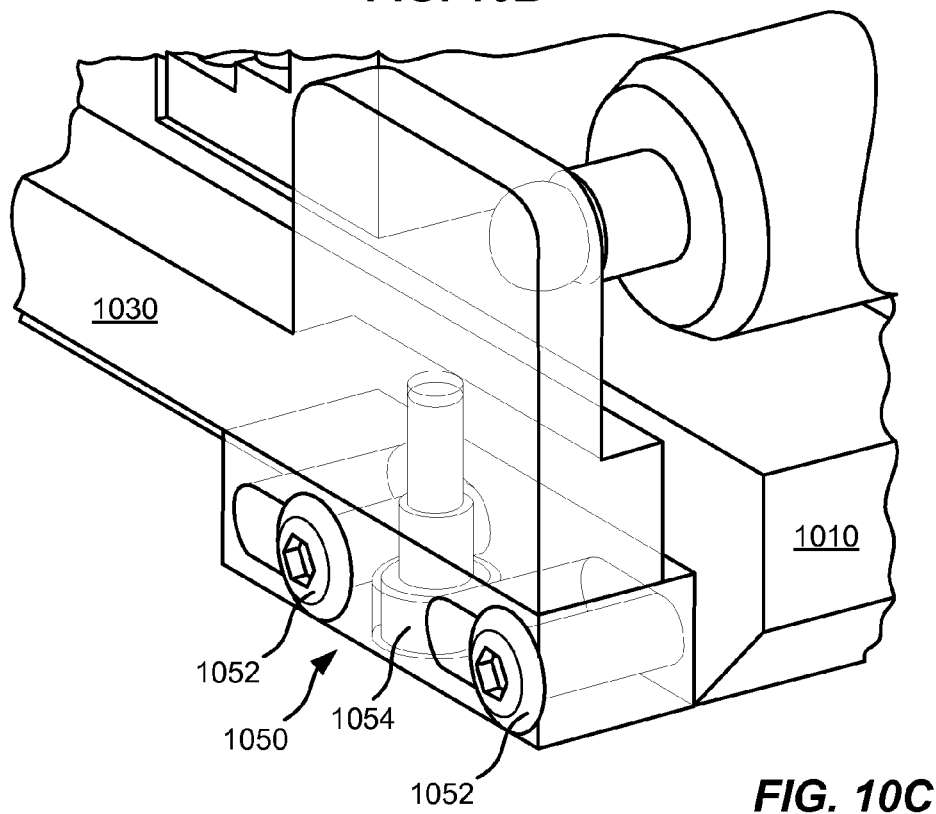
FIG. 10C is a simplified perspective view of the adjustable pivot block of the dual resolution translation stage illustrated in FIG. 10A.

FIG. 10C is a simplified perspective view of the adjustable pivot block of the dual resolution translation stage illustrated in FIG. 10A. The adjustable pivot block 1050 is attached to the stage assembly 1010 using screws 1052 in the illustrated embodiment. Referring to FIG. 10C, the adjustable pivot block 1050 includes a counter bored opening in the bottom of the block into which a shoulder screw 1054 is inserted from the bottom of the block. The shoulder screw 1054 screws into a tapped hole in the bottom of the lever arm 1030. When pressure is applied to the lever arm by the high resolution adjustment device, the shoulder screw will rotate with respect to the adjustable pivot block, enabling pivoting of the lever arm. Thus, in this embodiment, the cylindrical shoulder of the shoulder screw 1054 provides a cylinder defining the line along which the lever arm pivot point is located. In an alternative embodiment, the lever arm pivot is an cylindrical shaft extending from the bottom of the right end of the lever arm so that is mates with a lever arm pivot receiver, which is a cylindrical orifice extending into the body of the adjustable pivot block from the top of the block.

By loosening the screws 1052 attaching the adjustable pivot block 1050 to the stage assembly 1010, the position of the adjustable pivot block can be changed as it slides along the end of the stage assembly. Adjustment of this position will change the lever arm ratio since the distance from the low resolution adjustment device to the lever arm pivot will be changed. As an example, if the adjustable pivot block is slid to the left in FIG. 10C, the distance from the low resolution adjustment device to the lever arm pivot will increase, decreasing the lever arm ratio. In some embodiments, a scale is provided on the stage assembly similar to the scale 522 illustrated in FIG. 5B, providing for measurement of the position of the adjustable pivot block with respect to the stage assembly. In the embodiment illustrated in FIGS. 10A-10F, the adjustable pivot block 1050 is operable to slide in a direction perpendicular to a motion of the low resolution adjustment device and the high resolution adjustment device.

Figure 10D:
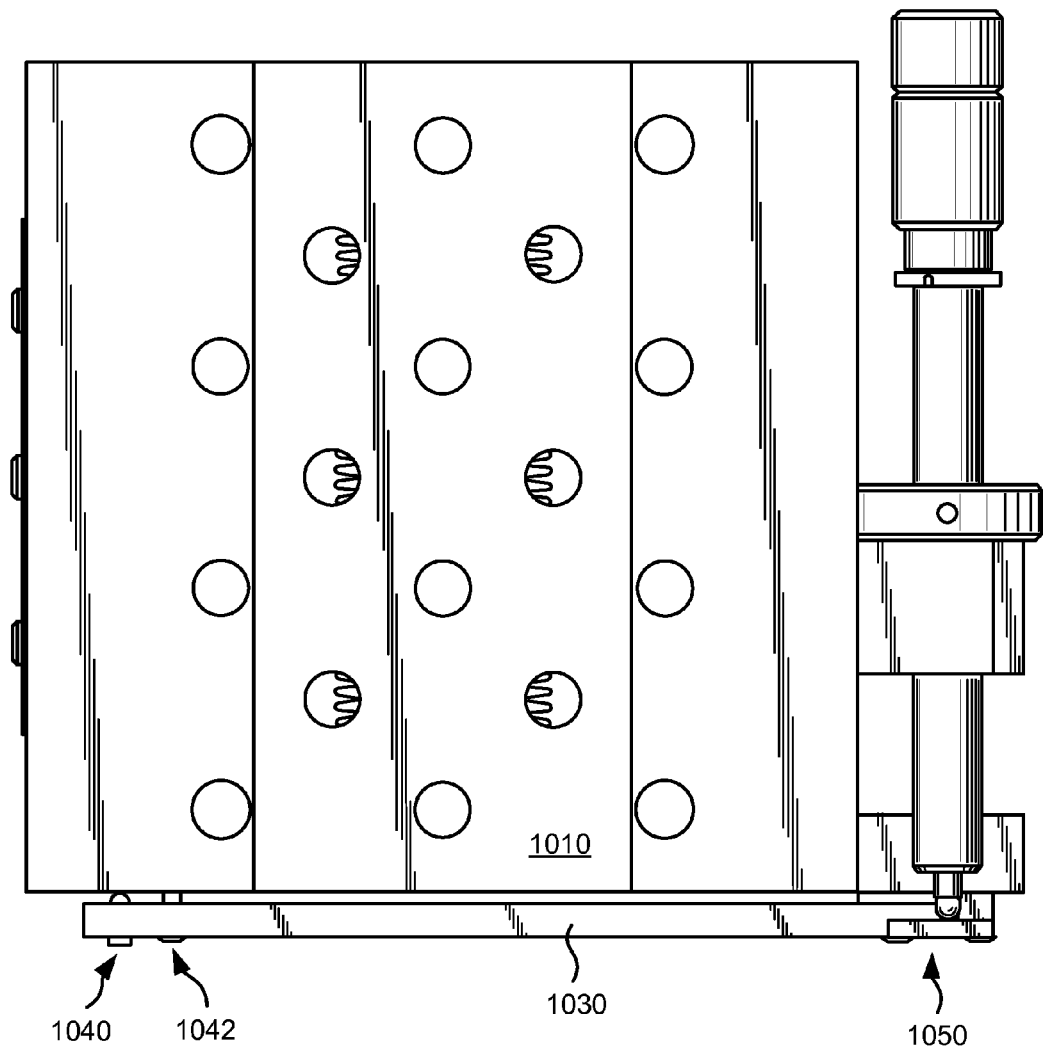
FIG. 10D is a simplified top view of the dual resolution translation stage illustrated in FIG. 10A.

FIG. 10D is a simplified top view of the dual resolution translation stage illustrated in FIG. 10A. This figure illustrates the high resolution adjustment device 1040, the locking mechanism 1042, and the adjustable pivot block 1050. For purposes of clarity, the portion of the lever arm extending above the adjustable pivot block to make contact with the low resolution adjustment device is not shown in this view. As illustrated in FIG. 10D, the position of the adjustable pivot block impacts the lever arm ratio since it changes the distance between lever arm pivot and the contact point between the shaft of the low resolution adjustment device.

Figure 10E:
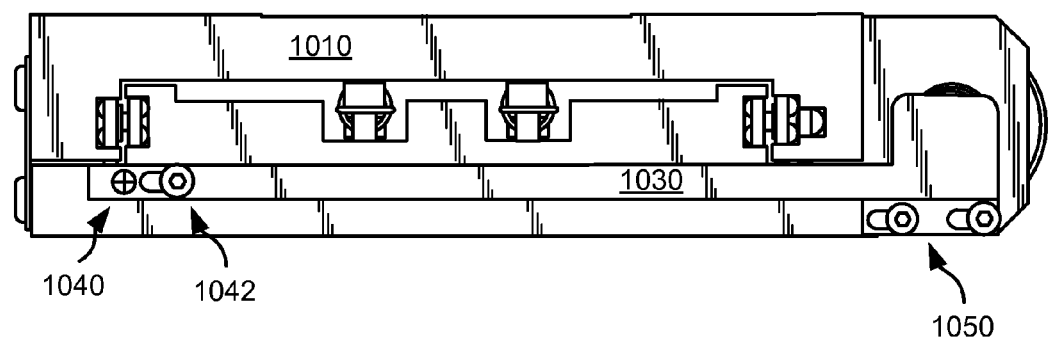
FIG. 10E is a simplified end view of the dual resolution translation stage illustrated in FIG. 10A.

FIG. 10E is a simplified end view of the dual resolution translation stage illustrated in FIG. 10A. As in FIG. 10D, the position of the high resolution adjustment device 1040, the locking mechanism 1042, and the adjustable pivot block 1050 are illustrated. Since the lever arm is connected to the adjustable pivot block using the shoulder screw in the illustrated embodiment, adjustment of the adjustable pivot block will modify the distance between the lever arm pivot and the contact point with the low resolution adjustment device.

Figure 10F:
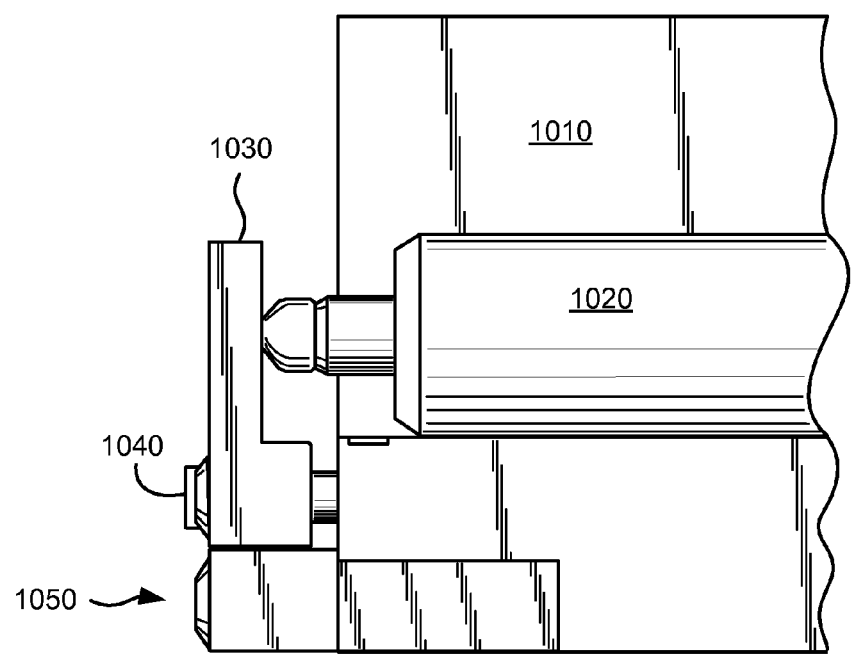
FIG. 10F is a simplified side view of the dual resolution translation stage illustrated in FIG. 10A.

FIG. 10F is a simplified side view of the dual resolution translation stage illustrated in FIG. 10A. This view, which, referring to FIG. 10D, shows the right end of the lever arm, is a view from the right side of the stage assembly and illustrates the low resolution adjustment device 1020 and the stage assembly 1010. The adjustable pivot block 1050 is connected to the lever arm 1030. The high resolution adjustment device 1040 is illustrated as extending from the surface of the lever arm opposing the stage assembly.

Figure 11:
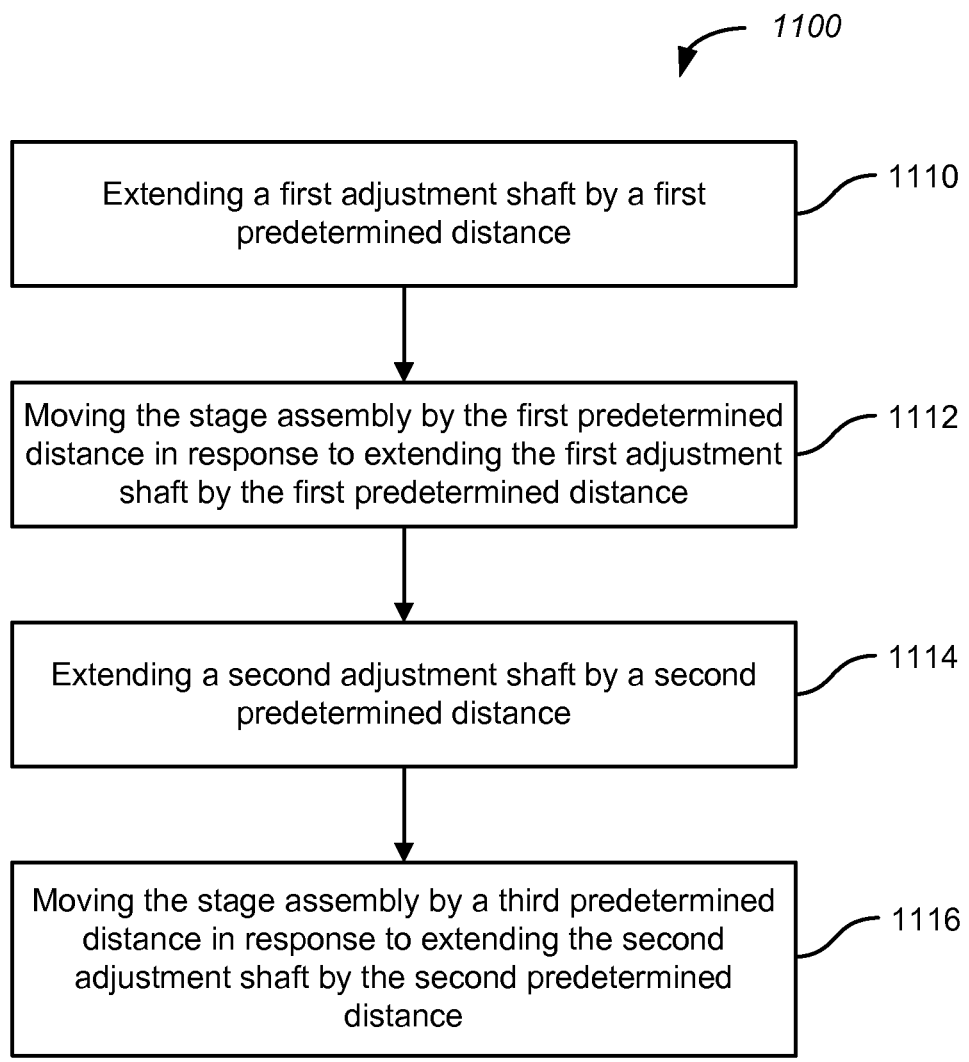
FIG. 11 is a simplified flowchart illustrating a method of operating a dual resolution translation stage according to an embodiment of the present invention.

FIG. 11 is a simplified flowchart illustrating a method of operating a dual resolution translation stage according to an embodiment of the present invention. The translation stage has a lever arm mechanically coupled to a stage assembly by a lever arm pivot. The method 1100 includes extending a first adjustment shaft (e.g., a micrometer) by a first predetermined distance (1110). The first adjustment shaft makes contact with the lever arm at a first contact point. Referring to FIG. 10D, the contact point between the shaft of the low resolution adjustment device and the lever arm is illustrated. The contact point may be a contact area and in this embodiment, the lever arm ratio can be computed based on the center of the contact area. The method also includes moving the stage assembly by the first predetermined distance in response to extending the first adjustment shaft by the first predetermined distance (1112). Since the distance between the lever arm and the stage assembly is initially static, extension of the shaft of the low resolution adjustment device results in sliding of the stage assembly in a direction away from the lever arm, which is parallel to the extension of the shaft. In this manner, the position of the stage assembly is adjusted at a low resolution.

The method further includes extending a second adjustment shaft (e.g., an adjustment screw, a micrometer, or the like) by a second predetermined distance (1114). The second adjustment shaft makes contact with the stage assembly at a second contact point. The method also includes moving the translation stage by a third predetermined distance in response to extending the second adjustment shaft by the second predetermined distance (1116). The third predetermined distance is equal to a projection of a line from the second contact point to a pivot point of the lever arm pivot, measured along the lever arm, divided by a projection of a line from the first contact point to the pivot point of the lever arm pivot, measured along the lever arm, times the second predetermined distance. As described throughout the present specification, the lever arm ratio provides a high resolution adjustment based on the low resolution adjustment.

In an embodiment, the lever arm pivot extends from an adjustable pivot block to mate with a recess in the lever arm. The method may also include shifting a position of the adjustable pivot block to increase a ratio of the projection of the line from the second contact point to the pivot point of the lever arm pivot to the projection of the line from the first contact point to the pivot point of the lever arm pivot. As discussed above, the position of the adjustable pivot block may be measured using a scale provided on the stage assembly.

It should be appreciated that the specific steps illustrated in FIG. 11 provide a particular method of operating a dual resolution translation stage according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A dual resolution translation stage comprising:
a stage assembly operable to receive an optical element;
a low resolution adjustment device mechanically coupled to the stage assembly;
an adjustable pivot block mechanically coupled to the stage assembly, wherein the adjustable pivot block comprises a pivot shaft;
a lever arm mechanically coupled to the adjustable pivot block, wherein the lever arm is operable to pivot about the pivot shaft, wherein the low resolution adjustment device and the pivot shaft are separated by a first distance measured along the lever arm; and
a high resolution adjustment device mechanically coupled to the lever arm and the stage assembly, wherein the high resolution adjustment device and the pivot shaft are separated by a second distance measured along the lever arm, the second distance being greater than the first distance.

2. The dual resolution translation stage of claim 1 further comprising a locking mechanism attached to the lever arm adjacent the high resolution adjustment device.

3. The dual resolution translation stage of claim 1 wherein the low resolution adjustment device comprises a micrometer.

4. The dual resolution translation stage of claim 1 wherein the low resolution adjustment device is mounted to a side of the stage assembly.

5. The dual resolution translation stage of claim 1 wherein the adjustable pivot block is operable to slide in a direction perpendicular to a motion of the low resolution adjustment device.

6. The dual resolution translation stage of claim 1 wherein the pivot shaft comprises a shoulder screw mounted in the adjustable pivot block and attached to the lever arm.

7. The dual resolution translation stage of claim 1 wherein the high resolution adjustment device comprises a screw extending through a portion of the lever arm.

8. The dual resolution translation stage of claim 2 wherein the locking mechanism is operable to constrain motion of a portion of the stage with respect to the adjustable pivot block.

9. The dual resolution translation stage of claim 1 wherein the low resolution adjustment device contacts the lever arm at a low resolution contact position proximal to the pivot shaft and the high resolution adjustment device contacts the lever arm at a high resolution contact position distal to the lever arm.

10. The dual resolution translation stage of claim 1 wherein the low resolution contact position and the high resolution contact position are disposed on opposite ends of the adjustable pivot block.

11. The dual-resolution translation stage of claim 1 further comprising a flexure pivot operable to provide a substantially constant distance between portions of the stage assembly and the adjustable pivot block.

12. The dual-resolution translation stage of claim 1 wherein the adjustable pivot block contains a recess and a portion of the lever arm is disposed in the recess.

* * * * *